United States Patent
Dee et al.

(10) Patent No.: US 11,414,176 B2
(45) Date of Patent: Aug. 16, 2022

(54) CONTROL SYSTEMS

(71) Applicant: BAE SYSTEMS plc, London (GB)

(72) Inventors: Justin Mark Dee, Rochester (GB); Jason Howard Bean, Rochester (GB)

(73) Assignee: BAE SYSTEMS plc, London (GB)

( * ) Notice: Subject to any disclaimer, the term of this patent is extended or adjusted under 35 U.S.C. 154(b) by 943 days.

(21) Appl. No.: 16/092,948

(22) PCT Filed: Mar. 28, 2017

(86) PCT No.: PCT/GB2017/050863
§ 371 (c)(1),
(2) Date: Oct. 11, 2018

(87) PCT Pub. No.: WO2017/178791
PCT Pub. Date: Oct. 19, 2017

(65) Prior Publication Data
US 2020/0198766 A1    Jun. 25, 2020

(30) Foreign Application Priority Data

Apr. 11, 2016    (GB) ..................................... 1606077

(51) Int. Cl.
*B64C 13/08*    (2006.01)
*B64C 13/10*    (2006.01)
(Continued)

(52) U.S. Cl.
CPC .......... *B64C 13/08* (2013.01); *B64C 13/0421* (2018.01); *B64C 13/0427* (2018.01); *B64C 13/10* (2013.01); *B64C 13/12* (2013.01)

(58) Field of Classification Search
CPC . B64C 13/08; B64C 13/0421; B64C 13/0427; B64C 13/345
See application file for complete search history.

(56) References Cited

U.S. PATENT DOCUMENTS 5,446,666 A * 8/1995 Bauer ................... B64C 13/503
701/16
2004/0159100 A1   8/2004 Bernard
(Continued)

FOREIGN PATENT DOCUMENTS

| GB | 2427906 A | 1/2007 |
| GB | 2482409 A | 2/2012 |

(Continued)

OTHER PUBLICATIONS

Astrom, K.J. and Murray, R.M., "Feedback Systems, An Introduction for Scientists and Engineers," Chapter Two, System Modeling, v2.10c—Princeton University Press, 2008. 48 pages.
(Continued)

*Primary Examiner* — Richard G Davis
(74) *Attorney, Agent, or Firm* — Finch & Maloney PLLC

(57) ABSTRACT

A control system (400) for an active inceptor (103) for a fly by wire aircraft permits a zero force null point to settle to a non-zero displacement trim position. An internal position state of a second order mass spring damper model is moved in conjunction with force-displacement characteristic coordinates. This results in no second order dynamics being superimposed on the feel of the inceptor (103) when dynamically adjusting the trim position, thereby eliminating the possibility of any unpleasant buzzing been felt by the operator of the inceptor during a trimming operation.

20 Claims, 5 Drawing Sheets

(51) Int. Cl.
  *B64C 13/04* (2006.01)
  *B64C 13/12* (2006.01)

(56) References Cited

U.S. PATENT DOCUMENTS

| | | |
|---|---|---|
| 2005/0173595 A1 | 8/2005 | Hoh |
| 2009/0187292 A1 | 7/2009 | Hreha et al. |
| 2012/0053735 A1* | 3/2012 | Tessier ................. B64C 13/503 700/275 |
| 2014/0021303 A1 | 1/2014 | Salamat et al. |

FOREIGN PATENT DOCUMENTS

| | | |
|---|---|---|
| JP | H0191890 A | 4/1989 |
| WO | 2015/066219 A1 | 5/2015 |
| WO | 2017/178789 A2 | 10/2017 |
| WO | 2017/178791 A2 | 10/2017 |

OTHER PUBLICATIONS

GB Search Report under Section 17(5) received for GB Application No. 1606074.1, dated Oct. 12, 2016. 3 pages.

International Search Report and Written Opinion received for PCT Application No. PCT/GB2017/050861, dated Dec. 1, 2017. 12 pages.

International Preliminary Report on Patentability received for PCT Application No. PCT/GB2017/050863, dated Oct. 25, 2018. 17 pages.

International Preliminary Report on Patentability received for PCT Application No. PCT/GB2017/050861, dated Oct. 25, 2018. 8 pages.

GB Search Report under Section 17(5) received for GB Application No. 1606077.4, dated Oct. 12, 2016. 4 pages.

International Search Report and Written Opinion received for PCT Application No. PCT/GB2017/050863, dated Mar. 29, 2018. 13 pages.

\* cited by examiner

CONTROL SYSTEMS

This invention relates to control systems and is particularly, though not exclusively, applicable to controls sticks (often referred to as 'inceptors') for aircraft, fixed wing or rotary wing.

A typical inceptor is used by a pilot to control pitch and roll of an aircraft and is often used as part of a fly by wire system. The inceptor may move in two axes with a fore and aft movement controlling pitch of the aircraft and a side to side movement controlling roll of the aircraft. In contrast to the classical control stick designs, in which the forces which act on the aircraft during the flight are transmitted to the control stick in the form of resistance and deflection, there is no such feedback in conventional fly-by-wire systems. Modern, passive inceptors have a fixed force feel characteristic provided by springs and dampers. Current active inceptors are provided with control systems which rely on a servo actuator mechanism incorporating force and position sensors and drive motors to permit the force feel characteristic of the inceptor to be modified continuously throughout flight.

According to a first aspect of invention there is provided a control system for a manually-operated control stick and for enabling the control stick to settle to a trim position when zero force is applied to the control stick by an operator, the control system including:

a first circuit comprising a summing circuit for a receiving a first signal representative of a force applied to the control stick by an operator and for receiving a second signal representing at least one force feedback signal and arranged to subtract the second signal from the first signal to provide a third signal;

a second circuit comprising a first integrator circuit for receiving the third signal and arranged to derive a velocity signal therefrom;

a third circuit comprising a second integrator circuit, having an internal state, for receiving the velocity signal and arranged to generate a position signal therefrom, wherein the second integrator also receives a trim input signal representative of the trim position and is arranged to sum the received trim input signal with its internal state to generate the position signal; and a fourth circuit, containing a predetermined force-position mapping characteristic, for receiving a position signal from the second integrator and the trim input signal and arranged to, when no trimming operation is required, extract a force value corresponding to the received position signal from the predetermined force-position mapping characteristic and output a force feedback signal to the first circuit representative of the extracted force value, and when a trimming operation is required, to modify the predetermined force-position mapping characteristic by shifting the position values in the predetermined force-position mapping characteristic by an amount equal to the trim position represented by the received trim input signal, and select a force value corresponding to a received position signal from the modified force-position mapping characteristic and output a force feedback signal representative of the selected force value to the first circuit.

The trim input signal may be a difference in trim point from a last iteration.

In a preferred embodiment, the third circuit includes a limiter circuit for limiting a magnitude of the position signal. The provision of such a limiter circuit may ensure that the generated position signal is not so high as to cause the control stick mechanism to go past its hard mechanical limits.

According to a second aspect of the invention there is provided method for controlling a manually-operated control stick and for enabling the control stick to settle to a trim position when zero force is applied to the control stick by an operator, the method including:

receiving a first signal representative of a force applied to the control stick by an operator, receiving a second signal representing at least one force feedback signal, subtracting the second signal from the first signal to provide a third signal;

receiving the third signal and deriving a velocity signal therefrom;

receiving the velocity signal at an integrator having an internal state and summing a received trim input signal representative of the trim position with said internal state and generating a position signal;

and receiving at a circuit containing a predetermined force-position mapping characteristic, the position signal and the trim input signal and, when no trimming operation is required, extracting a force value corresponding to the received position signal from the predetermined force-position mapping characteristic and outputting a force feedback signal representative of the extracted force value, and when a trimming operation is required, modifying the predetermined force-position mapping characteristic by shifting the position values in the predetermined force-position mapping characteristic by an amount equal to the trim position represented by the received trim input signal, and selecting a force value corresponding to a received position signal from the modified force-position mapping characteristic and outputting a force feedback signal representative of the selected force value.

Advantageously, a control system and method according to the invention enables a control stick to settle to a trim position or zero force null point, while the operator is performing a trimming operation, without introducing any perceptible vibration or 'buzzing' of the control stick during the adjustment period.

According to a fourth aspect of the invention, there is provided a tangible computer program product having an executable computer program code stored thereon for execution by a processor to perform methods in accordance with the invention.

The tangible computer program product may comprise at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

Other aspects of the invention comprise an inceptor system including a control stick and a control system in accordance with the first embodiment and an aircraft incorporating such an inceptor system.

These and other aspects, features and advantages of the invention will be apparent from, and elucidated with reference to, the embodiments described hereinafter.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

Figure 1:
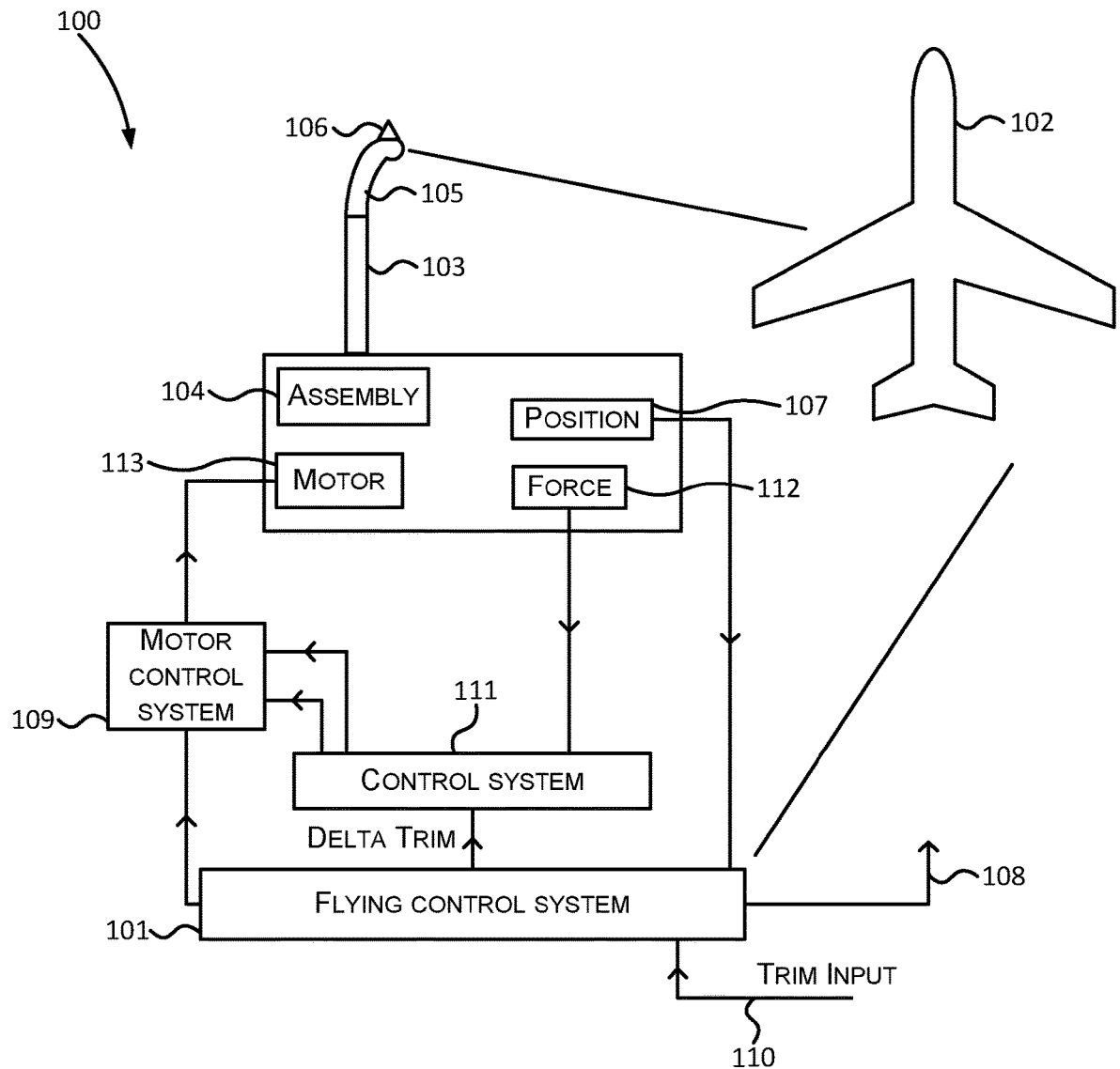
FIG. 1 is a simplified, schematic block diagram showing an example of inceptor system.

FIG. 1 shows a schematic block diagram of an inceptor system 100 which is coupled to a flight control system 101, both systems being incorporated in an aircraft 102. An inceptor 103 is coupled to a suitable two degree of freedom assembly 104 that permits the inceptor 103 to be moved in fore and aft and side to side directions. Conventionally, a fore and aft movement of the inceptor 103 controls pitch of the aircraft and a side to side movement of the inceptor controls roll of the aircraft. The inceptor 103 includes a manual grip 105 on which is mounted a trim switch 106. The trim switch can be moved (by an operator, using the thumb, for example) in side to side and fore and aft directions in order to trim roll and pitch respectively.

As is conventional, the inceptor system 100 may supply signals representative of aircraft pitch and roll commands to the flight control system 101. Such aircraft commands may be derived using suitable devices and techniques. Generally, such commands are related to the angular position of the inceptor 103. In the example of FIG. 1, a position sensor assembly 107 is coupled to the inceptor 103 and detects angular displacement of the inceptor 103 in both fore and aft and side to side directions. The position sensor assembly 107 supplies signals to the flight control system 101 which in turn provides control signals on output line 108 to actuators controlling the flying surfaces of the aircraft 102 and also supplies a position signal to a motor control system 109. The flight control system 101 also receives trim input signals on line at 110 from the trim switch 106 and provides an output signal (Delta trim) to a control system 111. The delta trim signal is a trim position signal which is the difference in a trim point (in pitch or roll) from the last iteration running in the flight control system 101

A force sensor 112 is also provided and coupled to the inceptor 103 for sensing an input force applied to the inceptor 103 by the pilot. An output from the force sensor is supplied to the control system 111. The control system 111 outputs position and velocity signals (derived from signals provided by the force sensor 112) to the motor control system 109. The motor control system 109 outputs a drive signal to a motor 113 which is coupled to the inceptor 103. The control system 111 and the motor control system 109 coupled thereto serve to drive the motor 113 so that the inceptor 103 is moved (by the motor) to a desired position which depends upon the force exerted on the inceptor 103 by an operator. Thus, the action of the motor also provides a force feel characteristic to the operator (pilot).

The control system 111 is configured to simulate a second order Mass-Spring-Damper (MSD) system. Such MSD systems are known and described in the literature. See for example http://www.cds.caltech.edu/~murray/books/AM08/pdf/am08-modeling_19Jul11.pdf.

Figure 2:
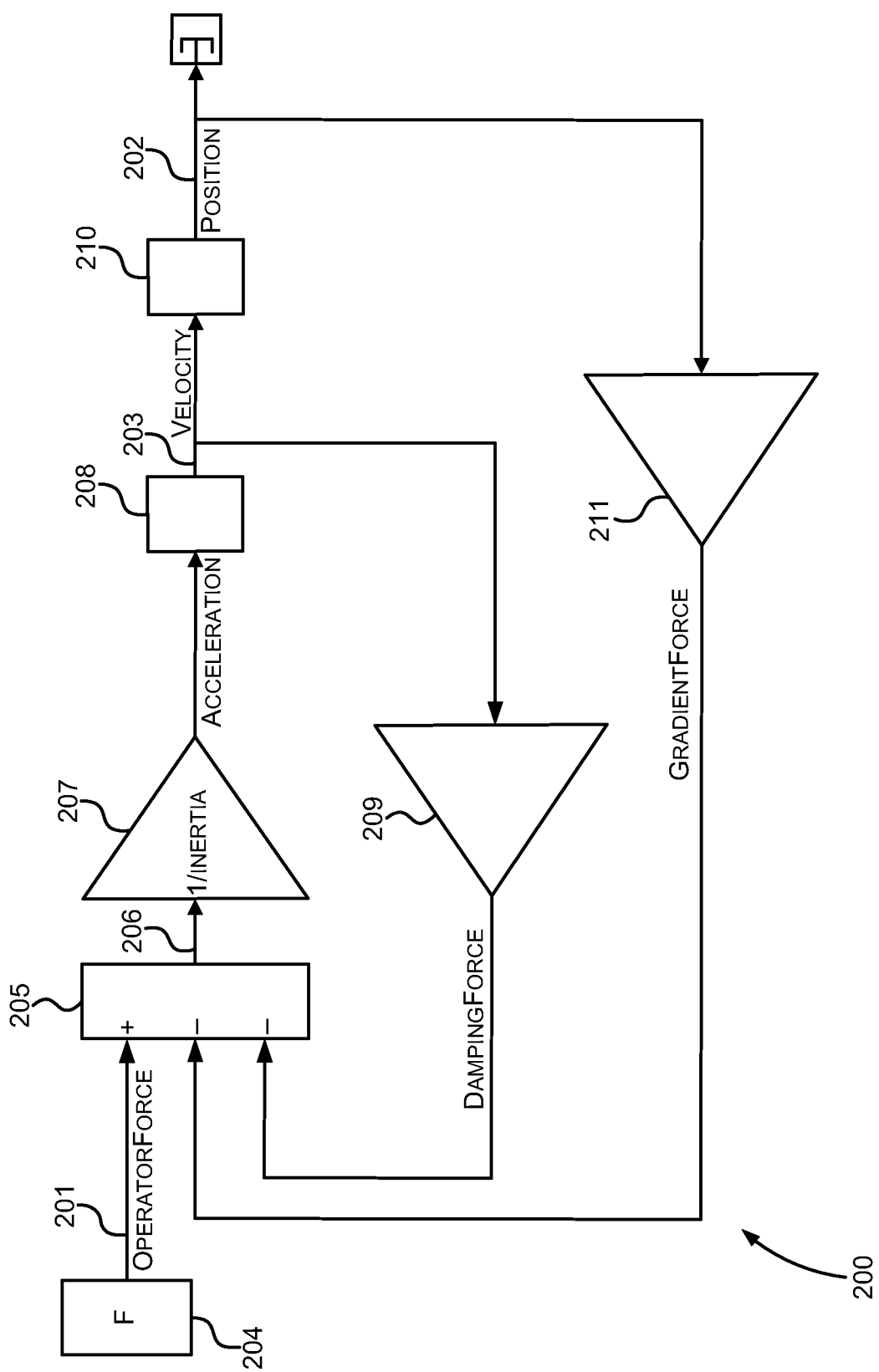
FIG. 2 is a simplified schematic block diagram of an example of control system without trim input.

FIG. 2 is a simplified block diagram illustrating components comprising the control system 111 of FIG. 1 and without any trim input. Two such control systems may be implemented in the inceptor system 100 of FIG. 1, one for roll and one for pitch. The control system 200 of FIG. 2 uses three MSD function parameters, that is inertia, damping and gradient to provide a model position output signal. The control system 200 uses an input signal (on line 201), representative of a force applied by an operator to the inceptor 103, to generate a feedback 'position' signal (or 'model position') on output line 202 and also a velocity signal on line 203, both of which may be used by the motor control system 109 (along with a position input from the flight control system 101) to generate a demand signal for driving the motor 113 (and therefore the inceptor) to a desired position which depends on the force being applied by the pilot to the inceptor 103.

A force 'F' input signal represented by the box numbered 204 in FIG. 2 is manually input into the inceptor 103 of FIG. 1 by an operator and the signal representing this operator force is input into a first summing circuit 205. Two other inputs are also received by the first summing circuit 205 and their generation and effect will be explained below. These two other inputs are actually subtracted from the force input F to provide a modified force input signal on line 206 which is fed into an input of a (1/inertia) gain circuit 207. The (1/inertia) gain circuit 207 operates in a conventional manner and outputs a signal representing an acceleration of the inceptor 103. An output of the (1/inertia) gain circuit 207 is then fed through a first integrator 208 which outputs a signal on line 203 representing a velocity. The velocity signal is fed through a damping force gain circuit 209 whose output is fed to the first summing circuit 205. The velocity signal is also fed to a second integrator 210 which outputs a signal on line 202 representing a position. The output of the second integrator 210 provides the output of the control system 200 on line 202 and is also fed to a gradient force gain circuit 211 whose output is fed into the first summing circuit 204.

Figure 3:
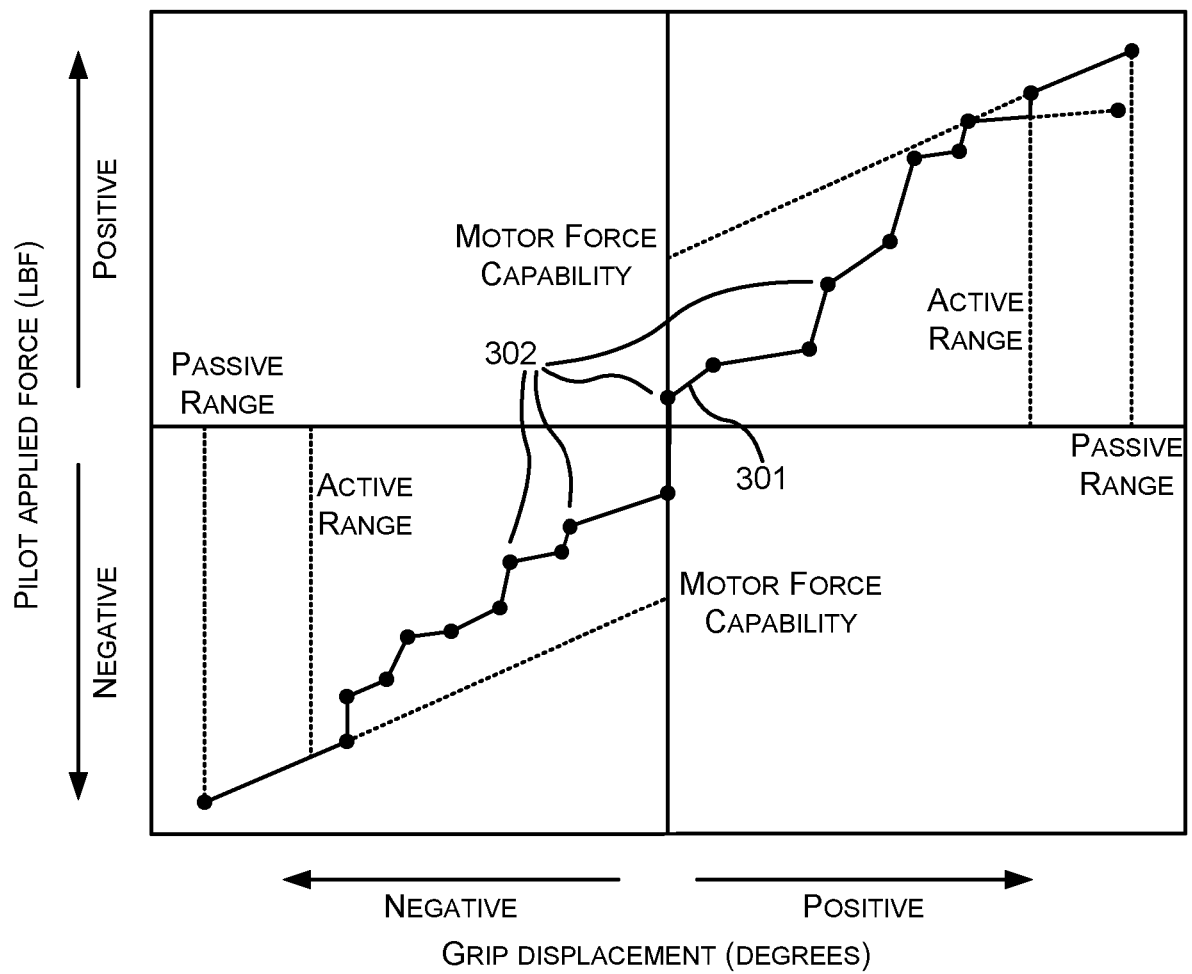
FIG. 3 is graph showing a force-position mapping characteristic.

The gradient force gain circuit 211 is configured to calculate a gradient force according to a complex series of co-ordinates which define a predetermined mapping characteristic from position (that is; inceptor angular displacement) to force. FIG. 3 shows an example of such a mapping characteristic (curve 301) where the abscissa relates to negative and positive angular displacements of the inceptor (that is; aft and forward movements representing pitch, for example) and the ordinate represents the force (positive when moving the inceptor forward; and negative when moving the inceptor in an rearward direction) which must be exerted on the inceptor by the pilot in order to achieve a particular (positive or negative) displacement. The mapping characteristic may be predetermined by the flight control system 101 and determines the "feel" to the pilot as he operates the inceptor 103. The coordinates 302 may be stored in a lookup table incorporated in the gradient force gain circuit 211 Thus, the gradient force gain circuit 211 takes a position output from the output of the second integrator 210, passes the position through the look up table of coordinates (of FIG. 3 for example), and outputs the corresponding force into the summing circuit 205.

The first summing circuit 205, first integrator 208, second integrator 210, damping force gain circuit 209 and gradient force gain control circuit 211 behave as a second order MSD system. The motor control system 109 will drive the inceptor to a desired position depending on the force applied and if the pilot should release the force on the inceptor so that the contribution of the input signal on line 201 to the summed forces in the summer 205 is zero, then the motor will drive the inceptor back to a null position. A typical MSD function will settle to a zero (or null) position when zero force is applied by the operator. However, it is often required that the zero force null point of the MSD function settles to a non-zero displacement, known as the 'trim position'. Therefore, the control system 111 may be modified so that the inceptor may be allowed to settle to a nonzero displacement, or "trim position" when zero force is applied. One way of doing this is to implement a trim function by providing an artificial offset operator force, calculated from a transmitted trim position and the force-position coordinates, which in turn accelerates the inceptor (held by the operator). This involves summing a trim term derived from an output of the trim switch 106 with the position output of the second integrator 210 and then feeding the sum into the gradient force gain circuit 211. However, the inceptor's response therefore includes the dynamics of the $2^{nd}$ order MSD system. This can result in an unpleasant "buzz" type feel at the inceptor grip 105 when the trim point is dynamically adjusted. An alternative arrangement which does not suffer from this 'buzz' type feel will now be described with reference to FIG. 4.

Figure 4:
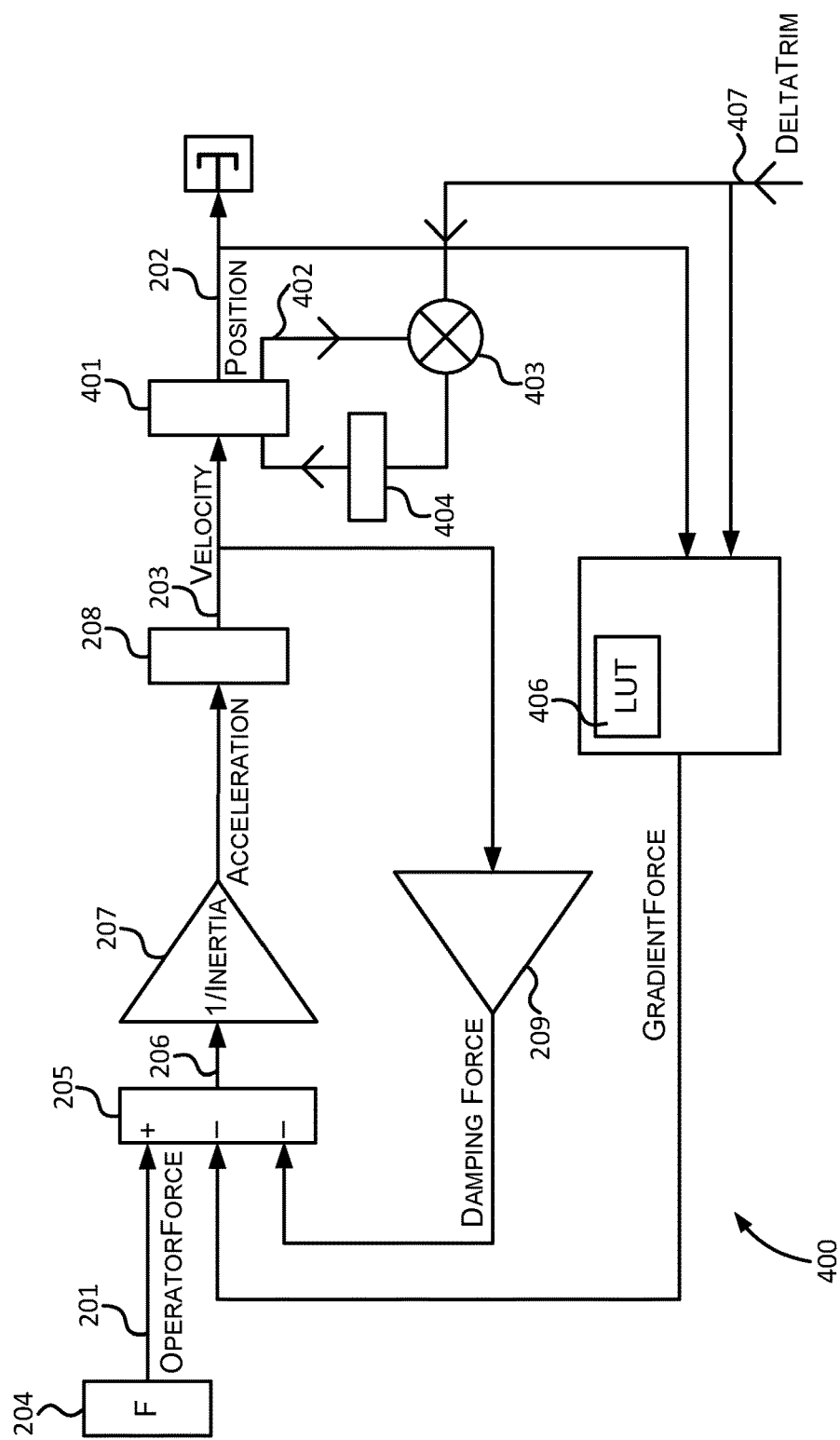
FIG. 4 is simplified schematic block diagram of an example of control system with trim input in accordance with an embodiment of the invention.

FIG. 4 is a simplified block diagram showing a modified control system having some features in common with the control system of FIG. 2 but including a means for incorporating a trim adjustment. Like components have been given the same reference numerals. Two such control systems may be implemented in the inceptor system of FIG. 1 to provide model position signals for both roll and pitch.

Similarly to the control system of FIG. 2, the control system 400 of FIG. 4 uses an input signal (on line 201), representative of a force applied by an operator to the inceptor 103, to generate a feedback 'position' signal (or 'model position') on output line 202 and also a velocity signal on line 203, both of which may be used by the motor control system 109 (along with a position input from the flight control system 101) to generate a demand signal for driving the motor 113 (and therefore the inceptor) to a desired position which depends on the force being applied by the pilot to the inceptor 103. However, the control system of FIG. 4 is also capable of allowing the inceptor 103 to be trimmed based on a trim signal from the manually-operated trim switch 106 (see FIG. 1).

A force 'F' input signal represented by the box numbered 204 in FIG. 4 is manually input into the inceptor 103 of FIG. 1 by an operator and the signal representing this operator force is input into a first summing circuit 205. Two other inputs are also received by the first summing circuit 205. These two other inputs are subtracted from the force input F to provide a modified force input signal on line 206 which is fed into an input of a (1/inertia) gain circuit 207. The (1/inertia) gain circuit 207 operates in a conventional manner and outputs a signal representing an acceleration of the inceptor 103. An output of the (1/inertia) gain circuit 207 is then fed through a first integrator 208 which outputs a signal on line 203 representing a velocity. The velocity signal is fed through a damping force gain circuit 209 whose output is fed into the first summing circuit 205. The velocity signal is also fed to a second integrator 401. An internal position state of the second integrator (on line 402) is summed in a summer 403 with an input 'delta trim.' An output of the summer 403 is passed through a limiter circuit 404 and back into the second integrator 401. The output of the second integrator on line 202 is thus a modified model position signal. The output of the second integrator 401 which provides the output of the control system 400 on line 202 is also fed to a functional module 405 which contains a look up table LUT 406. The functional module 405 also receives the delta trim input on line 407. The look up table 406 contains a force-displacement mapping characteristic of coordinates, for example as described above with reference to FIG. 3. When no trimming process is being carried out, the functional module 405 can behave in the same manner as the gradient force gain circuit 211 described above. Its operation when a trimming is to be carried out will be described below.

The delta trim input on line 407 is defined as the difference (or change) in trim point (in pitch or roll) from its value in the last iteration frame running in the flight control system 101. Delta trim may be calculated in the fight control system 191 from input signals provided by the trim switch 106. For example, the flight control system 101 may calculate a desired trim position and thus incremental changes in a desired trim position per iteration frame. By adding delta trim to the internal position state (or stored state) of the second integrator 401 the control system 400 increments or decrements the current model position (on line 202) depending on which way the trim point is currently moving. Simultaneously, the force position coordinate mapping in the functional module 405 is also moved according to delta trim. This is done in the functional module 405 by adjusting the stored co-ordinates read from the lookup table 406 in accordance with the delta trim input on line 407.

Figure 5:
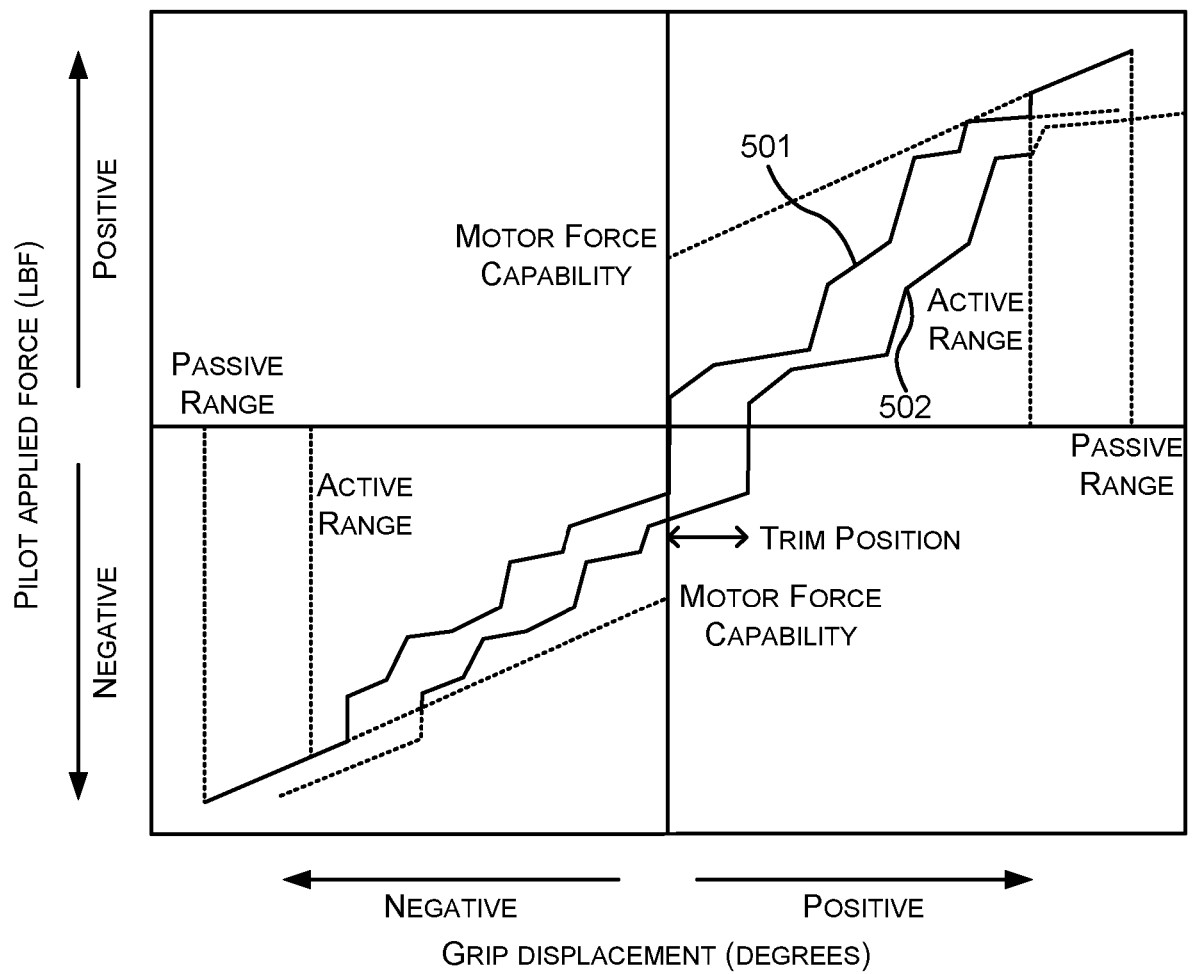
FIG. 5 is graph showing a force-position mapping characteristic shifted to account for a trim position.

FIG. 5 shows how the co-ordinates can be shifted from a curve 501 representing the stored coordinates to a second curve 502 which represents coordinate values shifted by an amount (which can be either in a positive or negative direction) dictated by delta trim. The functional module 405 then outputs the appropriate value for force which corresponds to the current model position value as received from the second integrator 401. As the internal position state and the position force coordinates are shifted by the same amount this results in no force being generated as a result of the model (represented by the control system 400) being moved to a new position on account of any trim input. The effect of moving the whole set of coordinates and the effect of the delta trim on the model position input makes sure that the output of the functional module 405 does not change from its last value.

This method of trimming moves the $2^{nd}$ order MSD system internal position state at the same time as the force-position coordinates, resulting in no forces being applied to the MSD model inertia. This results in no $2^{nd}$ order dynamics being superimposed on the feel of the inceptor when dynamically adjusting the trim position and hence an absence of any undesirable buzzing feel coming through the inceptor grip.

The purpose of the limiter 404 (see FIG. 4) which is an optional feature, is as follows. If the output of the second integrator 401 is greater than or equal to the positive operational range of the inceptor (or less than or equal to the negative operational range of the inceptor), then the delta trim signal is not summed with the last internal state of the second integrator 401. If none of the inceptor operational ranges are reached, then the limit doesn't apply and the delta trim signal is summed Although the specific examples have been described with reference to control sticks for aircraft, it will be understood that the principles disclosed herein may be equally applicable to other type of vehicles and machinery.

The signal processing functionality of the embodiments of the invention, particularly the second integrator 401 and functional module 405 may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A control system for a manually-operated control stick and for enabling the control stick to settle to a trim position when zero force is applied to the control stick by an operator, the control system including:
   a first circuit comprising a summing circuit for receiving a first signal representative of a force applied to the control stick by an operator and for receiving a second signal representing at least one force feedback signal and arranged to subtract the second signal from the first signal to provide a third signal;
   a second circuit comprising a first integrator circuit for receiving the third signal and arranged to derive a velocity signal therefrom;
   a third circuit comprising a second integrator circuit, having an internal state, for receiving the velocity signal and arranged to generate a position signal therefrom, wherein the second integrator also receives a trim input signal representative of the trim position and is arranged to sum the received trim input signal with its internal state to generate the position signal; and
   a fourth circuit, containing a predetermined force-position mapping characteristic, for receiving a position signal from the second integrator and the trim input signal and arranged to, when no trimming operation is required, extract a force value corresponding to the received position signal from the predetermined force-position mapping characteristic and output a force feedback signal to the first circuit representative of the extracted force value, and when a trimming operation is required, to modify the predetermined force-position mapping characteristic by shifting the position values in the predetermined force-position mapping characteristic by an amount equal to the trim position represented by the received trim input signal, and select a force value corresponding to a received position signal from the modified force-position mapping characteristic and output a force feedback signal representative of the selected force value to the first circuit.

2. The control system of claim 1 wherein the trim input signal is a difference in trim point from a last iteration.

3. The control system of claim 1 wherein the third circuit includes a limiter circuit for limiting a magnitude of the position signal.

4. The control system of claim 1 further including a fifth circuit for receiving the velocity signal and arranged to derive a further force feedback signal therefrom for application to the summing circuit.

5. The control system of claim 4 configured as a second order Mass Spring Damper system.

6. An inceptor system for an aircraft including a control stick and the control system of claim 1.

7. An aircraft including the inceptor system of claim 6.

8. The control system of claim 1 configured as a second order Mass Spring Damper system.

9. An aircraft including the inceptor system of claim 1.

10. A method for controlling a manually-operated control stick and for enabling the control stick to settle to a trim position when zero force is applied to the control stick by an operator, the method including:
   receiving a first signal representative of a force applied to the control stick by an operator, receiving a second signal representing at least one force feedback signal, subtracting the second signal from the first signal to provide a third signal;
   receiving the third signal and deriving a velocity signal therefrom;
   receiving the velocity signal at an integrator having an internal state and summing a received trim input signal representative of the trim position with said internal state and generating a position signal; and
   receiving at a circuit containing a predetermined force-position mapping characteristic, the position signal and the trim input signal and, when no trimming operation is required, extracting a force value corresponding to the received position signal from the predetermined force-position mapping characteristic and outputting a force feedback signal representative of the extracted force value, and when a trimming operation is required, modifying the predetermined force-position mapping characteristic by shifting the position values in the predetermined force-position mapping characteristic by an amount equal to the trim position represented by the received trim input signal, and selecting a force value corresponding to a received position signal from the modified force-position mapping characteristic and outputting a force feedback signal representative of the selected force value.

11. The method of claim 10 wherein the trim input signal is a difference in trim point from a last iteration.

12. The method of claim 10 further comprising limiting a magnitude of the position signal.

13. The method of claim 10 further comprising receiving the velocity signal and deriving a further force feedback signal therefrom.

14. A computer program product including one or more non-transitory computer readable mediums having instructions encoded thereon that when executed by one or more processors cause a process to be carried out for controlling a manually-operated control stick and for enabling the control stick to settle to a trim position when zero force is applied to the control stick by an operator, the process comprising:
   receiving a first signal representative of a force applied to the control stick by an operator, receiving a second signal representing at least one force feedback signal, subtracting the second signal from the first signal to provide a third signal;
   receiving the third signal and deriving a velocity signal therefrom;
   receiving the velocity signal at an integrator having an internal state and summing a received trim input signal representative of the trim position with said internal state and generating a position signal; and
   receiving at a circuit containing a predetermined force-position mapping characteristic, the position signal and the trim input signal and, when no trimming operation is required, extracting a force value corresponding to the received position signal from the predetermined force-position mapping characteristic and outputting a force feedback signal representative of the extracted force value, and when a trimming operation is required, modifying the predetermined force-position mapping characteristic by shifting the position values in the predetermined force-position mapping characteristic by an amount equal to the trim position represented by the received trim input signal, and selecting a force value corresponding to a received position signal from the modified force-position mapping characteristic and outputting a force feedback signal representative of the selected force value.

15. The computer program product of claim 14 wherein the one or more non-transitory computer readable mediums include at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

16. The computer program product of claim 14 wherein the trim input signal is a difference in trim point from a last iteration.

17. The computer program product of claim 14 the process further including limiting a magnitude of the position signal.

18. The computer program product of claim 14 the process further including receiving the velocity signal and deriving a further force feedback signal therefrom.

19. An inceptor system for an aircraft including a control stick and the computer program product of claim 14.

20. An aircraft including the computer program product of claim 14.

\* \* \* \* \*